(12) United States Patent
Imaizumi

(10) Patent No.: US 6,616,131 B2
(45) Date of Patent: Sep. 9, 2003

(54) HELICAL COMPRESSION SPRING FOR A VEHICLE SUSPENSION

(75) Inventor: Toshiyuki Imaizumi, Toyoake (JP)

(73) Assignee: Chuo Hatsujo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/013,468

(22) Filed: Dec. 13, 2001

(65) Prior Publication Data
US 2003/0111781 A1 Jun. 19, 2003

(51) Int. Cl.$^7$ .............................. B60G 11/14; F16F 1/06
(52) U.S. Cl. ........................................ 267/170; 267/179
(58) Field of Search ................................ 267/166–180, 267/286, 287

(56) References Cited

U.S. PATENT DOCUMENTS

| 6,199,882 | B1 | | 3/2001 | Imaizumi et al. | |
|---|---|---|---|---|---|
| 6,328,290 | B1 | | 12/2001 | Imaizumi et al. | |
| 6,375,174 | B2 | * | 4/2002 | Hasegawa et al. | 267/167 |
| 2001/0035601 | A1 | * | 11/2001 | Imaizumi et al. | 267/286 |
| 2002/0089108 | A1 | * | 7/2002 | Imaizumi | 267/248 |
| 2002/0105127 | A1 | * | 8/2002 | Imaizumi | 267/195 |

FOREIGN PATENT DOCUMENTS

| EP | 0 976 590 A1 | 2/2000 |
|---|---|---|
| EP | 0 976 591 A1 | 2/2000 |
| JP | 2000-103216 A | 4/2000 |
| JP | 2000-104772 A | 4/2000 |
| JP | 2000-351311 A | 12/2000 |

OTHER PUBLICATIONS

Satoshi Suzuki et al., "Approaches to Minimizing Side Force of Helical Coil Springs in Suspension Design," *Japan Society for Spring Research*, Aug. 28, 1995, pp. 19–26.

"Trends in Vehicle Dynamics Developments," *Automotive Engineering*, Sep. 1997, pp. 56–57.

Satoshi Suzuki et al., "Approaches to Minimizing Side Force of Helical Coil Springs for Riding Comfort," *SAE Technical Paper Series*, 960730, Society of Automotive Engineers, Inc., 1996, pp. 15–22.

Takashi Gotoh et al., "Optimization of Force Action Line with New Spring Design on the Macpherson Strut Suspension for Riding Comfort," *SAE 2000 Transactions*, Section 6, vol. 109, Society of Automotive Engineers, Inc., 2000, pp. 108–114.

"Close–up," *Nikkei Mechanical*, No. 551, Aug. 2000, pp. 18–24.

U.S. patent application Ser. No. 10/013,650, Imaizumi et al., filed Dec. 13, 2001.

* cited by examiner

*Primary Examiner*—Christopher P. Schwartz
(74) *Attorney, Agent, or Firm*—Burns, Doane, Swecker & Mathis, LLP

(57) ABSTRACT

The present invention is directed to a helical compression spring for a vehicle suspension to be compressed between an upper seat and a lower seat. The spring is formed to provide an end coil center line connecting the centers of an upper end coil and a lower end coil to be offset to a coil axis of a body portion of the spring. A pitch of the lower end coil is set to tilt a lower end plane of the spring at a first predetermined angle to the lower seat in a direction for shortening the longitudinal length of one side of the spring closer to the end coil center line than the coil axis, in an unloaded state of the spring, and/or a pitch of the upper end coil is set to tilt an upper end plane of the spring at a second predetermined angle in a direction for shortening the longitudinal length of the other side of the spring closer to the coil axis than the end coil center line, in the unloaded state of the spring.

4 Claims, 5 Drawing Sheets

HELICAL COMPRESSION SPRING FOR A VEHICLE SUSPENSION

BACKGROUND OF THE INVENTION

1. Field of the Invention

The present invention relates to a helical compression spring for use in a strut type vehicle suspension, and relates to a strut type vehicle suspension having a helical compression spring.

2. Description of the Related Arts

In general, a vehicle suspension is provided with a helical compression spring, which is generally designed to provide a coil axis that coincides with a direction of reaction force of the spring. Various types of vehicle suspension system have been known heretofore. Among them, a strut type suspension with a shock absorber employed as a strut for positioning a wheel is popular. According to the strut type suspension, however, due to a displacement between its load input axis and strut axis, a bending moment is exerted on the strut, with side force acting on a guide and a piston of the strut. This side force prevents the piston from sliding smoothly in the guide to act as the shock absorber. In order to compensate the bending moment, it has been known to arrange a coil axis of a cylindrical helical compression spring to be offset to the strut axis.

Since the arrangement between the coil axis of the helical compression spring and the strut axis of the shock absorber is determined geometrically, it has been required that the helical compression spring should be designed to coincide its coil axis with the direction of reaction force of the spring. In order to meet such requirement, various studies have been made, including the article "Approaches to Minimizing Side Force of Helical Coil Springs in Suspension Design", presented by engineers including the inventor of the present application, and received by Japan Society for Spring Research on Aug. 28, 1995, wherein it was proposed to minimize the side force of the helical compression spring.

In contrast, on pages 56 and 57 of "Automotive Engineering" issued on September 1997, there are disclosed two kinds of spring having a coil axis inclined to an axis of a shock absorber so as to minimize a friction of the shock absorber for a strut type suspension. One spring is so constituted that one end coil is formed into a pig tail coil, and an axis for connecting the center of the pig tail coil and the center of the other end coil is served as the axis of the shock absorber, and that the axis and a spring force direction (reaction force direction) are arranged to provide a certain angle so that they are intersected at the center of the other end coil. The other spring is so constituted that both end coils are formed into the pig tail coils, and an axis for connecting the centers of those end coils is served as the axis of the shock absorber, and that the axis and the spring force direction are arranged to provide a certain angle so that they are intersected at a longitudinal center of the spring.

With respect to the vehicle suspension, further reduction in size is required now. By means of mere improvement made to a supporting mechanism of the strut having a conventional cylindrical helical compression spring, therefore, it is difficult to compensate the bending moment exerted on the strut due to load from a road. Rather, it is necessary to positively increase a side force applied by the helical compression spring to the strut type suspension. However, it is not easy to apply a desired side force to the suspension by the conventional helical compression spring. By means of the helical spring disclosed in the aforementioned publication of the Automotive Engineering, sufficient side force necessary for the strut type suspension can not be obtained. Namely, it is impossible to apply the side force to the guide portion and piston portion of the strut enough to compensate the side force exerted thereon.

SUMMARY OF THE INVENTION

Accordingly, it is an object of the present invention to provide a helical compression spring for a strut type suspension with a simple structure to apply a desired side force to the strut when mounted on the strut type suspension.

Another object of the present invention is to provide a strut type vehicle suspension for applying a desired side force to a strut of the suspension.

In accomplishing the above and other objects of the present application, a helical compression spring for a vehicle suspension according to the present invention is compressed between an upper seat and a lower seat. The spring is formed to provide an end coil center line connecting the centers of an upper end coil and a lower end coil of the spring to be offset to a coil axis of a body portion of the spring. A pitch of the lower end coil is set to tilt a lower end plane of the spring seated on the lower seat at a first predetermined angle to the lower seat in a direction for shortening the longitudinal length of one side of the spring closer to the end coil center line than the coil axis, in an unloaded state of the spring, and/or a pitch of the upper end coil is set to tilt an upper end plane of the spring seated on the upper seat at a second predetermined angle in a direction for shortening the longitudinal length of the other side of the spring closer to the coil axis than the end coil center line, in the unloaded state of the spring.

Preferably, the upper end coil and the lower end coil are formed in a pig tail configuration, respectively.

A strut type vehicle suspension according to the present invention includes a strut mounted at the upper end thereof on a vehicle body for supporting a wheel, a lower seat fixed to the strut, an upper seat mounted on the vehicle body, and a helical compression spring mounted between the lower seat and the upper seat, with the strut enclosed in the spring. The helical spring is preferably formed to provide an end coil center line connecting the centers of an upper end coil and a lower end coil of the spring to be offset to a coil axis of a body portion of the spring. The lower seat is fixed to the strut to tilt the lower seat at a first predetermined angle in a direction for shortening the longitudinal length of one side of the spring closer to the coil axis than the end coil center line, and/or the upper seat is mounted on the vehicle body to tilt the upper seat at a second predetermined angle in a direction for shortening the longitudinal length of the other side of the spring closer to the end coil center line than the coil axis. And, the spring is held in such a state that the other side of the spring closer to the end coil center line than the coil axis is positioned at the inside of the vehicle body.

In the strut type vehicle suspension as described above, the upper end coil and the lower end coil of the spring may be formed in a pig tail configuration, respectively.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
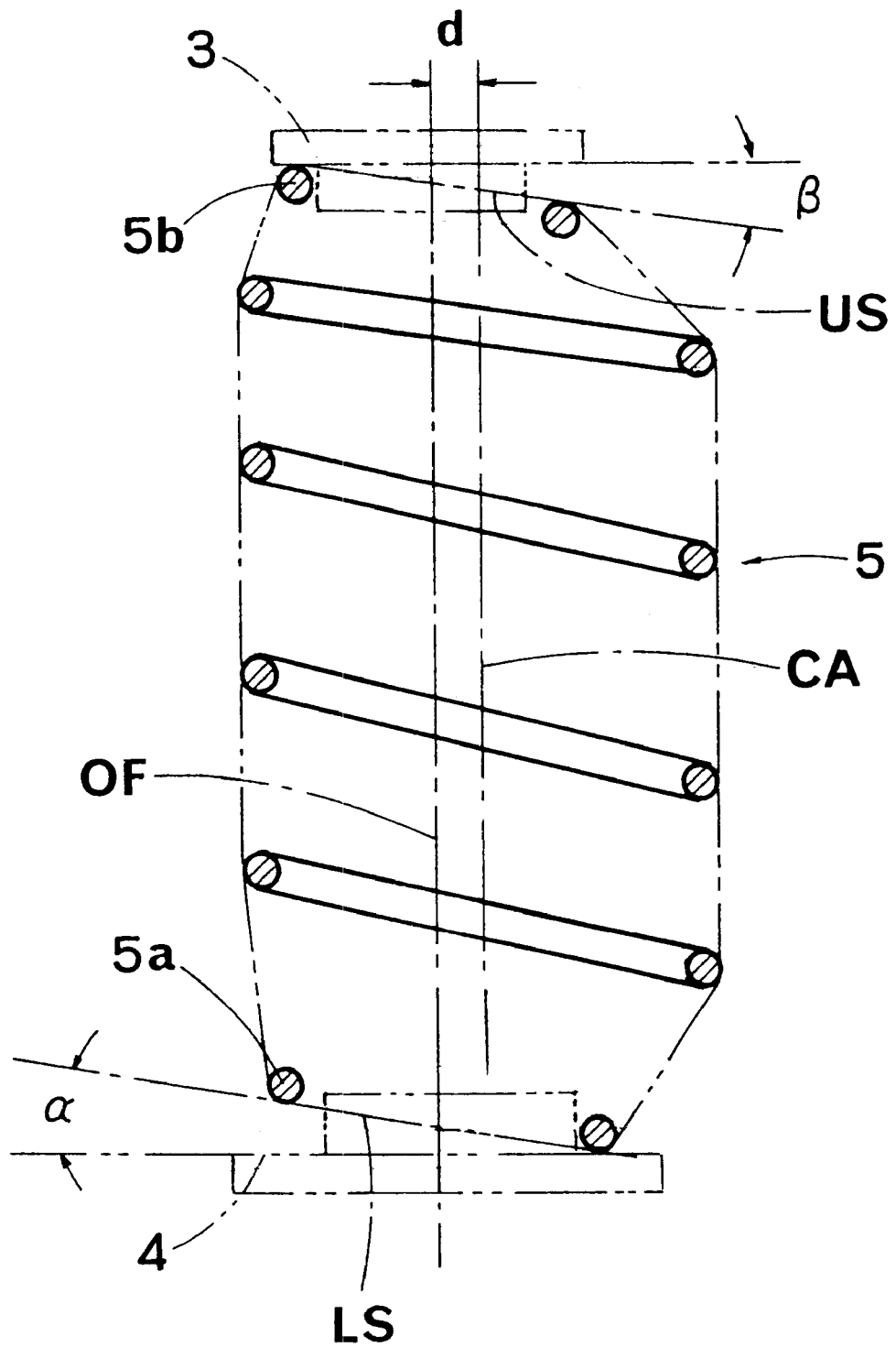
FIG. 1 is a side view of a helical compression spring for use in a vehicle suspension according to an embodiment of the present invention.

Referring to FIG. 1, there is schematically illustrated a helical compression spring 5 (hereinafter, simply referred to as a helical spring 5) for use in a vehicle suspension. The helical spring 5 is mounted on a strut type suspension (hereinafter, simply referred to as suspension) as shown in FIG. 2, which illustrates the suspension by two-dot chain lines except for a portion for supporting the upper end of the helical spring 5.

At the outset, the overall structure of the suspension will be explained with reference to FIG. 2. A strut 2 is elastically mounted at its upper end on a vehicle body 1, and an upper seat 3 is mounted on the vehicle body 1. A lower seat 4 is fixed to a middle portion of the strut 2. Between the upper seat 3 and the lower seat 4, the helical spring 5 is arranged to encircle therein the strut 2. The lower end of the strut 2 is fixed to a knuckle 6, which is pivotally mounted on the vehicle body 1 through a lower arm 7. Accordingly, a wheel 8 is mounted on the knuckle 6, which is connected to the vehicle body 1 through the strut 2 and the helical spring 5, and which is connected to the vehicle body 1 through the lower arm 7. The strut 2 is provided with a cylinder 2a and a rod 2b which is slidably mounted in the cylinder 2a, to form a shock absorber. The rod 2b is mounted at its upper end on the vehicle body 1 through the strut mount 10, and the cylinder 2a is fixed at its lower end to the knuckle 6. The strut mount 10 includes a lower bracket 12 for mounting the upper seat 3 on the vehicle body 1 through a bearing 11, an upper bracket 13 connected by bolts (not shown) to the vehicle body 1 together with the lower bracket 12, and a damper rubber 14 disposed between them. A supporting bracket 15 is fixed to the tip end of the rod 2b, and supported by the damper rubber 14 between the lower bracket 12 and the upper bracket 13. According to the present embodiment, therefore, the strut mount 10 is of a type with load transmitted separately, wherein the strut 2 is mounted on the vehicle body 1 through the damper rubber 14, whereas the helical spring 5 is mounted on the vehicle body 1 through the bearing 11. As a result, any stress which is caused when the helical spring 5 is compressed and expanded can be absorbed properly. The damper rubber 14 is arranged so that the reaction force axis of the helical spring 5 extends through approximately the center of the upper end plane US.

Figure 2:
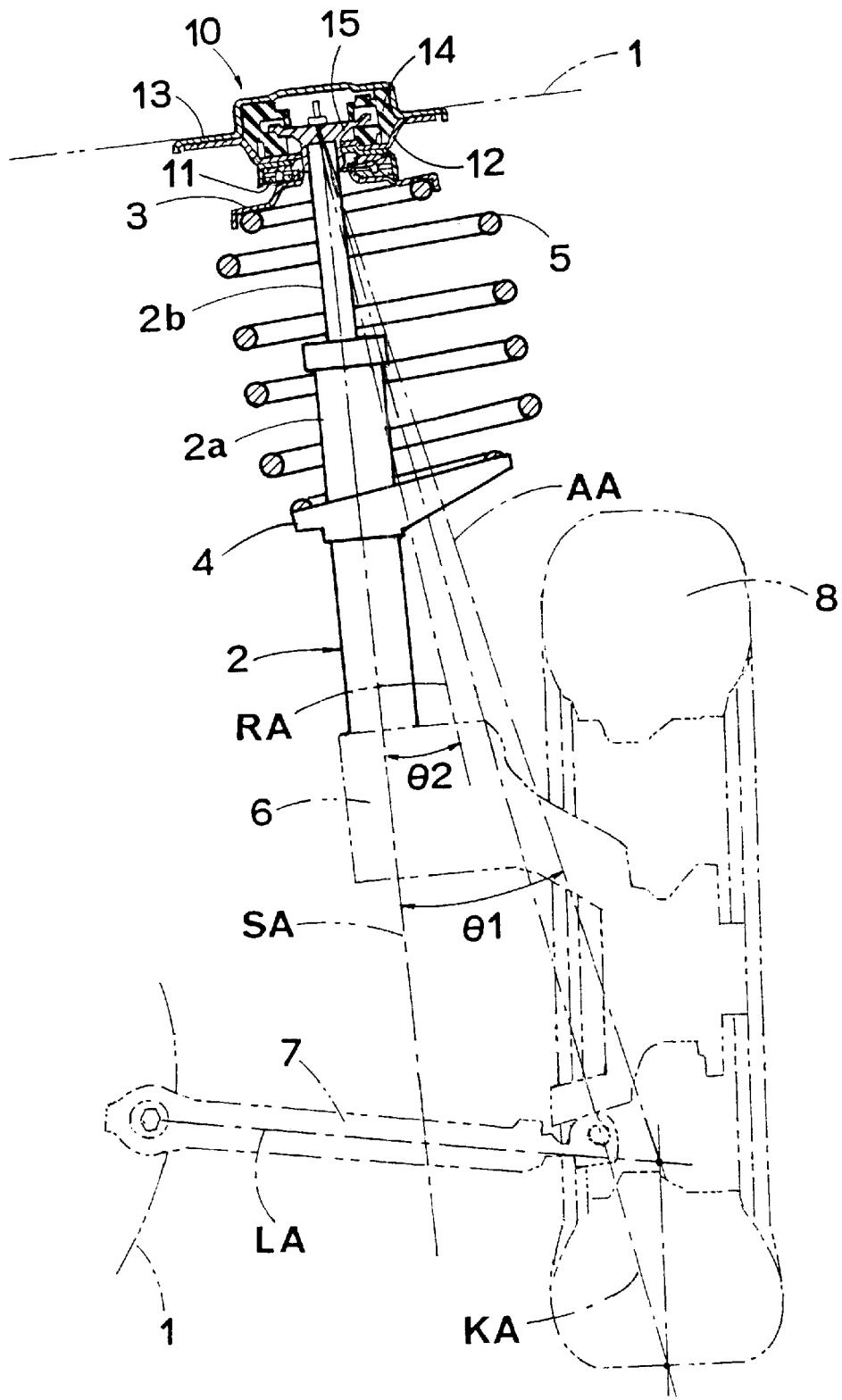
FIG. 2 is a side view of a vehicle suspension with a helical compression spring installed thereon according to an embodiment of the present invention.

According to the suspension as shown in FIG. 2, the reaction force axis RA does not coincide with the load input axis AA. That is, the strut axis SA of the strut 2 and the load input axis AA form an angle $\theta 1$, whereas the strut axis SA and the reaction force axis RA form an angle $\eta 2$. In FIG. 2, "LA" designates the axis of the lower arm 7, "KA" designates the axis of a king pin (not shown). Due to the relationship between the reaction force axis RA and the strut axis SA which do not coincide with each other, sliding resistance may be caused between the cylinder 2a and the rod 2b of the strut 2. However, the sliding resistance will be compensated for by the biasing force of the helical spring 5 to ensure a smooth sliding motion of the rod 2b, as will be described later.

According to the present embodiment, the helical spring 5 as shown in FIG. 1 is formed with a lower end coil 5a and an upper end coil 5b, both of which are formed to provide a pig tail, respectively. The helical spring 5 is formed to provide an end coil center line OF for connecting the centers of the lower end coil 5a and the upper end coil 5b, i.e., the centers of the lower end plane LS and the upper end plane US to be offset to a coil axis CA of a body portion of the helical spring 5 by a distance "d". And, a pitch of the lower end coil 5a is set to tilt the lower end plane LS of the helical spring 5 at a first predetermined angle $\alpha$ to the lower seat 4 in a direction (clockwise in FIG. 1) for shortening the longitudinal length of one side (left side in FIG. 1) of the helical spring 5 with the end coil center line OF offset to the coil axis CA, i.e., the longitudinal length of one side of the helical spring 5 closer to the end coil center line OF than the coil axis CA, in an unloaded state of the helical spring 5. Also, a pitch of the upper end coil 5b is set to tilt the upper end plane US of the helical spring 5, at a second predetermined angle $\beta$ to the upper seat 3 in the direction (clockwise in FIG. 1) for shortening the longitudinal length of the other side (right side in FIG. 1) of the spring opposite to the one side of the spring with the end coil center line OF offset to the coil axis CA, i.e., the longitudinal length of the other side of the helical spring 5 closer to the coil axis CA than the end coil center line OF, in the unloaded state of the helical spring 5.

In this case, the relationship between the lower end plane LS and the lower seat 4 is relative to each other. According to the embodiment as shown in FIG. 1, the lower seat 4 is placed on the horizontal plane, whereas the lower end plane LS is tilted by the predetermined angle $\alpha$. On the contrary, the lower end plane LS may be placed on the horizontal plane, whereas the lower seat 4 may be tilted by the predetermined angle $\alpha$ to the lower plane LS. Likewise, the relationship between the upper end plane US and the upper seat 3 is relative to each other. According to the embodiment as shown in FIG. 1, the upper seat 3 is placed on the horizontal plane, and the upper plane US is tilted by the predetermined angle $\beta$. Alternately, the upper plane US may be placed on the horizontal plane, and the upper seat 3 may be tilted by the predetermined angle $\beta$ to the upper plane US.

According to the present embodiments as described above, in the unloaded state of the helical spring 5, the pitch of the lower end coil 5a is set to tilt the lower end plane LS at the first predetermined angle α to the lower seat 4, clockwise in FIG. 1, and the pitch of the upper end coil 5b is set to tilt the upper end plane US at the second predetermined angle β clockwise in FIG. 1. However, only either one of the pitch of the lower end coil 5a and that of the upper end coil 5b may be set. That is, in addition to the above-described embodiment, a second embodiment (not shown) may be formed, such that the helical spring 5 is formed to provide the end coil center line OF of the helical spring 5 to be offset to the coil axis CA, and only the pitch of the lower end coil 5a is set to tilt the lower end plane LS at a predetermined angle δ to the lower seat 4 in the unloaded state of the helical spring 5. And, a third embodiment (not shown) may be formed, such that the helical spring 5 is formed to provide the end coil center line OF of the helical spring 5 to be offset to the coil axis CA, and only the pitch of the upper end coil 5b is set to tilt the upper end plane US at a predetermined angle δ to the upper seat 3, in the unloaded state of the helical spring 5.

The helical spring 5 as constituted above is disposed between the upper seat 3 and the lower seat 4, which are arranged substantially in parallel with each other as shown by two-dotted chain lines FIG. 1. In this case, the helical spring 5 is held such that the one side of the helical spring 5 with the end coil center line OF offset to the coil axis CA, i.e., the one side of the helical spring 5 closer to the coil end center line OF than the coil axis CA (left side in FIG. 1), is to be positioned at the inside of the vehicle.

Figure 3:
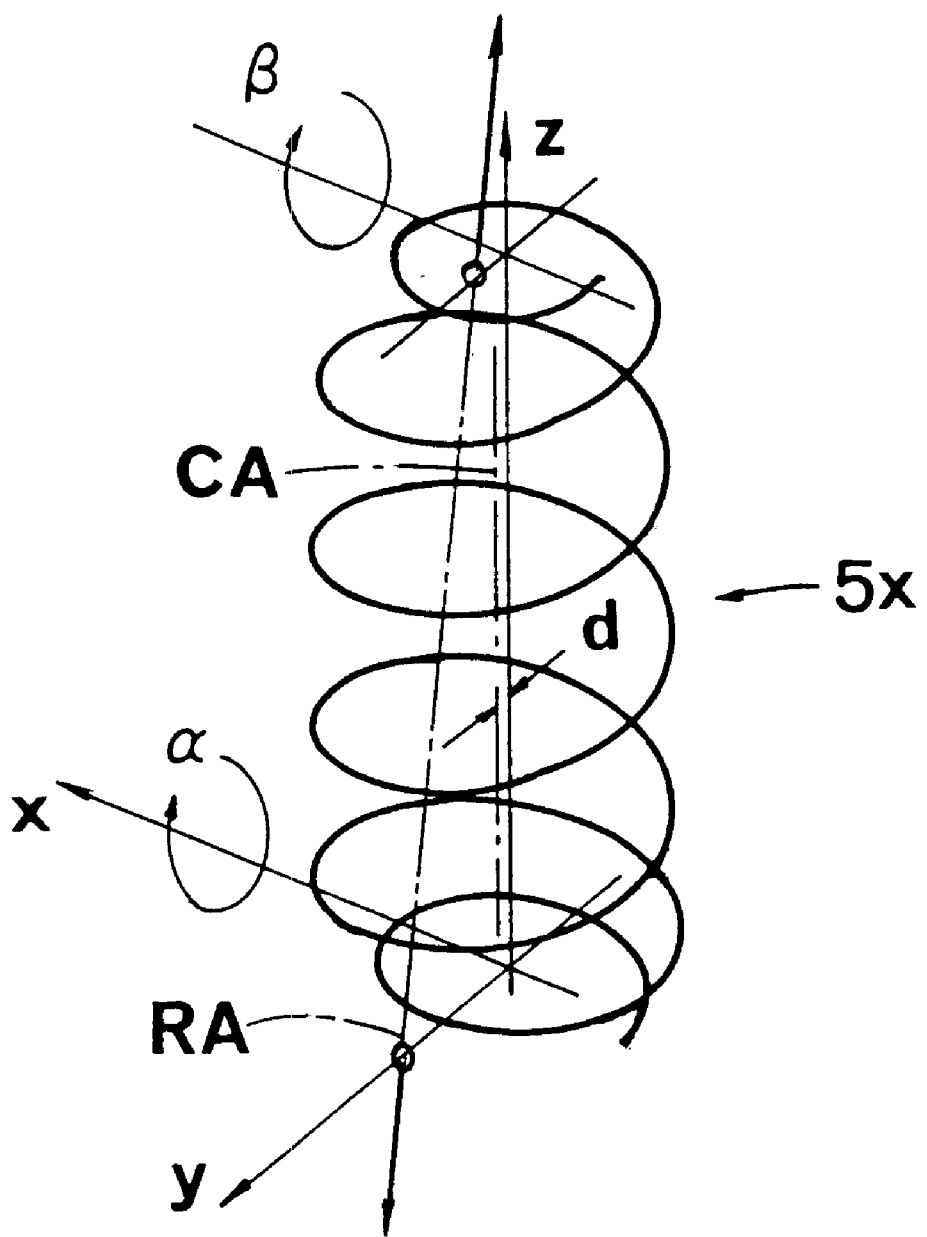
FIG. 3 is a perspective view showing a model helical compression spring for experimenting the spring to investigate influence on a spring reaction force by tilting a lower end plane and an upper end plane of the spring.

FIG. 3 shows a model helical compression spring 5x having its lower end coil and upper end coil formed into the pig tail coils, with the end coil center line OF (z-axis in FIG. 3) offset to the coil axis by the distance "d", such as the aforementioned spring 5. The helical spring 5x is used for an experiment to investigate influence on the spring reaction force caused by tilting the lower end plane to the lower seat and/or the upper end plane to the upper seat. Hereinafter, will be explained results of the experiments in the case where the helical spring 5x is compressed to shorten the longitudinal length of either one side of the helical spring 5x, i.e., the upper end plane and lower end plane of the helical spring 5x are rotated counterclockwise about the x-axis as viewed from the positive side of the x-axis toward the origin, by α degree and β degree, respectively, as shown in FIG. 3.

Figure 4:
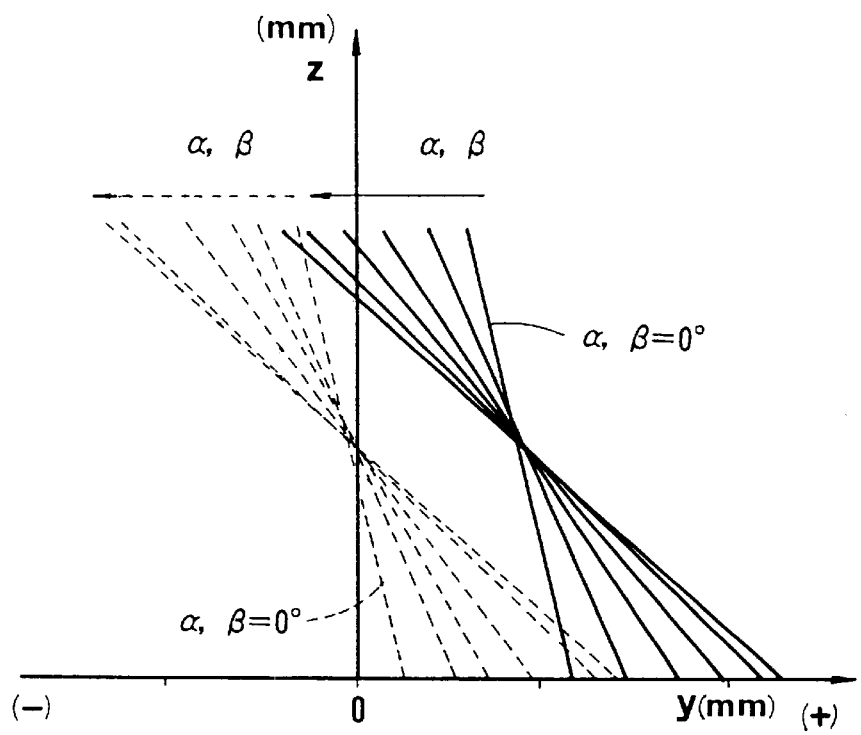
FIG. 4 is a diagram showing a variation of a reaction force axis of a helical compression spring, in the case where an upper end plane and a lower end plane are rotated in the counterclockwise about the x-axis as viewed from the positive side of the x-axis toward the origin, when the spring as shown in FIG. 3 is compressed to a predetermined height.

In FIG. 4, solid lines indicate variation of the reaction force axis of the helical spring 5x as shown in FIG. 3, in the case where the upper end plane and the lower end plane are rotated counterclockwise about the x-axis as viewed from the positive side of the x-axis toward the origin, by α degree and β degree, respectively, when the helical spring 5x is compressed to a predetermined height. Broken lines indicate variation of the reaction force axis of a conventional helical spring with its upper end coil and lower end coil formed to provide the pig tail coils. When rotational angles which are rotated about the x-axis in FIG. 3, i.e., tilting angles α and β, are increased counterclockwise, the reaction force axis will move as indicated by the arrows, which indicate the directions of increasing angles α and β. The reaction force axis lies on the line for connecting the points of application of the reaction forces acting on the upper end plane and lower end plane.

As shown in FIG. 4, the following results are obtained from the experiment. Namely, (1) By forming the helical spring with the end coil center line offset to the coil axis by the distance "d", the reaction force axis of the spring is displaced parallel in the y-direction, i.e., in the direction opposite to the direction of the end coil center line OF (z-axis in FIG. 3) offset to the coil axis CA. (2) With an increase of the tilting angles α and β of the upper and lower end planes counterclockwise in FIG. 3, the inclination of the reaction force axis of the spring in the y-direction increases. In other words, the side force applied to the helical spring increases, with an increase of the tilting angles α and β. (3) With an increase of the tilting angles α and β of the upper and lower end planes, the point of application of the reaction force on the upper end plane gets close to the center of the upper end plane, i.e., z-axis in FIG. 4, as indicated by the solid lines according to the helical spring 5x, whereas the conventional helical spring gets away from the center of the upper end plane as indicated by the broken lines.

On the contrary, in the case where the upper end plane and the lower end plane are rotated clockwise about the x-axis as viewed from the positive side of the x-axis toward the origin, when the helical spring 5x is compressed to a predetermined height, the inclination of the reaction force axis in the y-direction will be reduced, i.e., the side force to the helical spring will be reduced, with the tilting angles α and β increased clockwise.

Figure 5:
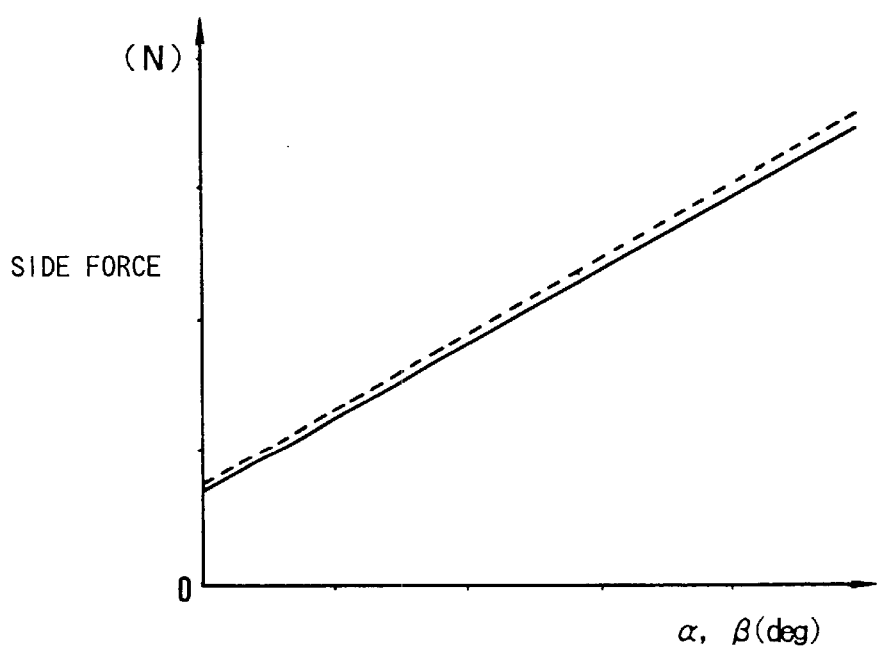
FIG. 5 is a diagram showing a variation of a side force in response to a rotating angle, in the case where an upper end plane and a lower end plane are rotated in the counterclockwise about the x-axis as viewed from the positive side of the x-axis toward the origin, when the spring as shown in FIG. 3 is compressed to a predetermined height.

FIG. 5 indicates a variation of the side force, in the case where the upper end plane and the lower end plane of the helical spring 5x as shown in FIG. 3 are rotated counterclockwise about the x-axis in FIG. 3 as viewed from the positive side of the x-axis toward the origin, by α degree and β degree, when the helical spring 5x is compressed to a predetermined height, and in the case where the degree α or β is increased. In FIG. 5, a solid line indicates the variation of the helical spring 5 according to the present embodiment, and a broken line indicates the variation of the conventional helical spring. As clearly shown in FIG. 5, the side force is increased with an increase of the tilting angle α or β, and no significant difference can be seen between the solid line and the broken line.

Figure 6:
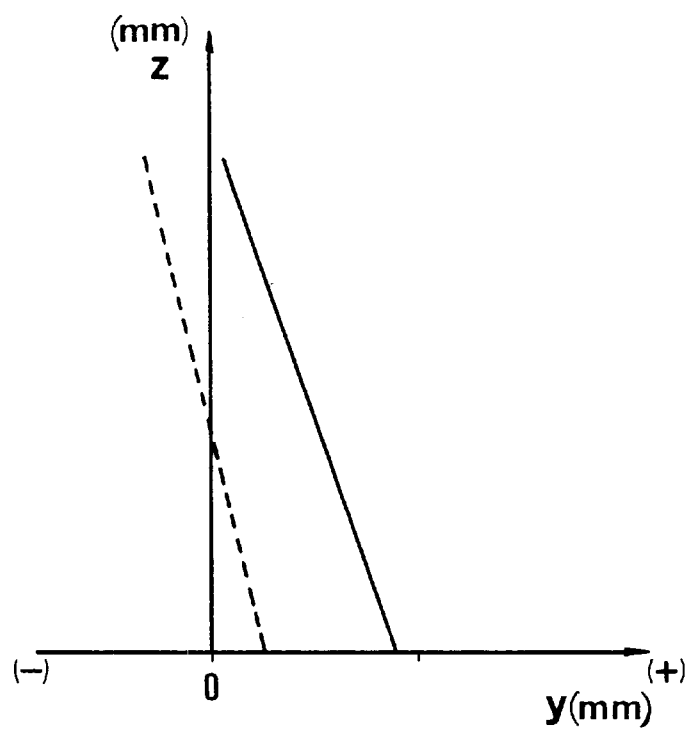
FIG. 6 is a diagram showing reaction force axes as compared between a conventional helical compression spring and a helical compression spring which is so constituted that one end coil is formed into a pig tail coil, and that an axis for connecting the center of the pig tail coil and the center of the other end coil and a spring force direction (reaction force direction) are arranged to provide a certain angle so that they are intersected at the center of the other end coil.
Figure 7:
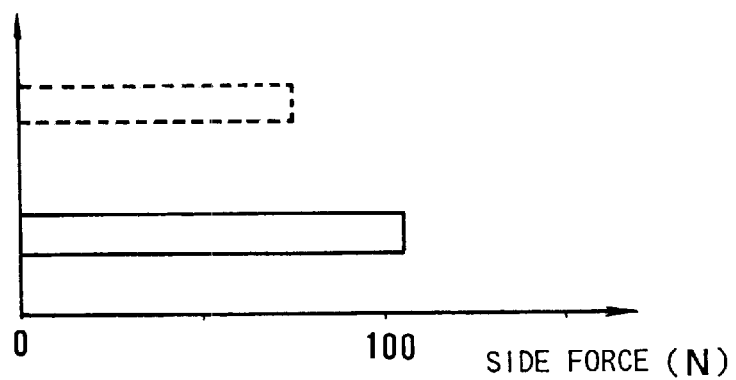
FIG. 7 is a diagram showing side forces as compared between a helical spring as shown in FIG. 6 and a conventional helical compression spring.

FIG. 6 shows a result of analysis about a helical compression spring, which is so constituted that one end coil is formed into a pig tail coil, and that an axis for connecting the center of the pig tail coil and the center of the other end coil and a spring force direction (reaction force direction) are arranged to provide a certain angle so that they are intersected at the center of the other end coil, and which is called as "a specific coil" herein, out of the helical springs as disclosed in the aforementioned publication of the Automotive Engineering. And, FIG. 7 shows a result of the comparison between the specific spring and the conventional spring, with respect to the side force. That is, FIG. 6 shows the comparison between reaction force axes of the specific spring and the conventional spring, and FIG. 7 shows the magnitude of side force of each spring. In FIGS. 6 and 7, a solid line indicates the specific spring, and a broken line indicates the conventional spring. As apparent from FIGS. 6 and 7, the specific spring may be effective for placing the point applied with the reaction force close to the center of the coil, but the side force is increased only a little, so that it is insufficient for the side force required when the spring is installed in the strut suspension.

Therefore, the helical spring 5 according to the present embodiment, the offset amount "d" as shown in FIG. 1 and tilting angles α and β (clockwise rotational angles as shown in FIG. 1) are set, and the pitches of the upper end coil 5b and lower end coil 5a are set, such that the helical spring 5 is disposed between the upper seat 3 and the lower seat 4 as shown in FIG. 2, in the same condition that the upper end coil and the lower end coil of the helical spring 5x as shown in FIG. 3 are rotated counterclockwise about the x-axis as viewed from the positive side of the x-axis toward the origin in FIG. 3, by α degree and β degree, respectively, when the helical spring 5x is compressed to a predetermined height. Consequently, when the helical spring 5 as shown in FIG. 1 is disposed between the upper seat 3 and the lower seat 4 arranged substantially in parallel with each other, it is arranged in the state as shown in FIG. 2, and the same effect can be obtained as the one obtained when the upper end coil and the lower end coil of the helical spring 5x as shown in FIG. 3 are tilted counterclockwise as viewed from the positive side of the x-axis toward the origin in FIG. 3.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A helical compression spring for a vehicle suspension to be compressed between an upper seat and a lower seat, said spring being formed to provide an end coil center line connecting the centers of an upper end coil and a lower end coil of said spring to be offset to a coil axis of a body portion of said spring, wherein a pitch of said lower end coil is set to tilt a lower end plane of said spring seated on said lower seat at a first predetermined angle to said lower seat in a direction for shortening the longitudinal length of one side of said spring closer to said end coil center line than said coil axis, in an unloaded state of said spring, and/or a pitch of said upper end coil is set to tilt an upper end plane of said spring seated on said upper seat at a second predetermined angle in a direction for shortening the longitudinal length of the other side of said spring closer to said coil axis than said end coil center line, in the unloaded state of said spring.

2. The helical compression spring of claim 1, wherein said upper end coil and said lower end coil are formed in a pig tail configuration, respectively.

3. A strut type vehicle suspension comprising a strut mounted at the upper end thereof on a vehicle body for supporting a wheel, a lower seat fixed to said strut, an upper seat mounted on said vehicle body, and a helical compression spring mounted between said lower seat and said upper seat, with said strut enclosed in said spring, wherein said spring is formed to provide an end coil center line connecting the centers of an upper end coil and a lower end coil of said spring to be offset to a coil axis of a body portion of said spring, wherein said lower seat is fixed to said strut to tilt said lower seat at a first predetermined angle in a direction for shortening the longitudinal length of one side of said spring closer to said coil axis than said end coil center line, and/or said upper seat is mounted on said vehicle body to tilt said upper seat at a second predetermined angle in a direction for shortening the longitudinal length of the other side of said spring closer to said end coil center line than said coil axis, and wherein said spring is held in such a state that the other side of said spring closer to said end coil center line than said coil axis is positioned at the inside of said vehicle body.

4. The strut type vehicle suspension of claim 3, wherein said upper end coil and said lower end coil of said spring are formed in a pig tail configuration, respectively.

* * * * *